US012756269B2

(12) United States Patent
Blaser et al.

(10) Patent No.: US 12,756,269 B2
(45) Date of Patent: Oct. 6, 2026

(54) ROTOR FOR A HIGH-SPEED ELECTRICAL MACHINE

(71) Applicant: Celeroton TurboCell AG, Volketswil (CH)

(72) Inventors: Manuel Blaser, Volketswil (CH); Andreas Looser, Volketswil (CH); Fabian Dietmann, Volketswil (CH)

(73) Assignee: CELEROTON TURBOCELL AG, Volketswil (CH)

( * ) Notice: Subject to any disclaimer, the term of this patent is extended or adjusted under 35 U.S.C. 154(b) by 155 days.

(21) Appl. No.: 18/574,854

(22) PCT Filed: Jul. 6, 2022

(86) PCT No.: PCT/EP2022/068664
§ 371 (c)(1),
(2) Date: Dec. 28, 2023

(87) PCT Pub. No.: WO2023/280894
PCT Pub. Date: Jan. 12, 2023

(65) Prior Publication Data

US 2024/0356408 A1 Oct. 24, 2024

(30) Foreign Application Priority Data

Jul. 7, 2021 (EP) .................................... 21184164

(51) Int. Cl.
*H02K 7/08* (2006.01)
*H02K 1/22* (2006.01)

(52) U.S. Cl.
CPC ................ *H02K 7/08* (2013.01); *H02K 1/22* (2013.01)

(58) Field of Classification Search
CPC .. H02K 7/08; H02K 1/22; H02K 7/14; H02K 7/1823; H02K 2205/03; H02K 1/02; H02K 7/003; H02K 2213/03
(Continued)

(56) References Cited

U.S. PATENT DOCUMENTS 3,683,248 A * 8/1972 Kazutsugu Kobayashi ................ H02K 29/12 310/68 E
4,063,850 A * 12/1977 Hueber .................. F01D 5/026 417/409
(Continued)

FOREIGN PATENT DOCUMENTS

CN 107313962 A 11/2017
EP 2 314 878 A1 4/2011
(Continued)

OTHER PUBLICATIONS

International Search Report dated Oct. 20, 2022, Application No. PCT/EP2022/068664; 2 pages.
(Continued)

*Primary Examiner* — Ahmed Elnakib
(74) *Attorney, Agent, or Firm* — Rankin, Hill & Clark LLP

(57) ABSTRACT

A rotor for a high-speed electrical machine with gas bearings includes at least one rotor side radial bearing, a rotor side axial bearing, a rotor body including the at least one rotor side radial bearing, and a rotor end piece including the rotor side axial bearing. When seen along the rotor's axis of rotation, a radial bearing section is defined as a section along which a radial bearing extends. Therein, the rotor end piece radially surrounds the rotor body at the interface of these two parts.

20 Claims, 2 Drawing Sheets

(58) Field of Classification Search
USPC ............................................................ 310/90
See application file for complete search history.

(56) References Cited

U.S. PATENT DOCUMENTS

| | | | | |
|---|---|---|---|---|
| 4,585,396 | A | 4/1986 | Kawamura et al. | |
| 4,639,194 | A * | 1/1987 | Bell, III | F01D 5/025 415/217.1 |
| 4,679,960 | A * | 7/1987 | Mizuhara | C04B 37/026 403/334 |
| 4,749,334 | A * | 6/1988 | Byrne | F01D 5/025 416/241 B |
| 4,854,025 | A * | 8/1989 | Oda | C04B 37/021 29/527.1 |
| 4,942,999 | A * | 7/1990 | Oda | C04B 37/026 228/124.1 |
| 5,028,162 | A * | 7/1991 | Tsuno | C04B 37/026 403/41 |
| 6,841,912 | B2 | 1/2005 | Yamada et al. | |
| 7,052,241 | B2 * | 5/2006 | Decker | B22F 7/08 428/553 |
| 2004/0051416 | A1 * | 3/2004 | Yamada | F04D 29/053 310/156.28 |
| 2019/0249682 | A1 * | 8/2019 | Bonnefoi | F04D 29/057 |
| 2020/0028402 | A1 * | 1/2020 | Looser | F16C 32/0614 |
| 2020/0036263 | A1 * | 1/2020 | Pydin | H02K 9/06 |

FOREIGN PATENT DOCUMENTS

| | | | |
|---|---|---|---|
| JP | 59-85302 | U | 6/1984 |
| WO | 2017/202941 | A1 | 11/2017 |
| WO | 2020/002509 | A1 | 1/2020 |

OTHER PUBLICATIONS

English translation of Japanese Office Action mailed Mar. 10, 2026, Application No. 2024-500302; 3 pages.

* cited by examiner

ROTOR FOR A HIGH-SPEED ELECTRICAL MACHINE

BACKGROUND OF THE INVENTION

Field of the Invention

The invention relates to the field of electrical machines. It relates to a rotor for a high-speed electrical machine with gas bearings.

Description of the Invention

An electric motor generally includes a rotor and a stator, the stator including a stator body supporting and housing an electrical stator and bearings. The bearings include one or more radial (also called journal) and axial (also called thrust) bearings being gas bearings. Often, two radial bearings are present. They can be located at opposite sides of the stator, that is with electromagnetic elements driving the rotor being arranged in between the two radial bearings, or on the same side of the stator. The latter arrangement is often called overhanging motor design. With the overhanging design, the two radial bearings can be integrated into a single part. However, this approach generally results in longer rotors and therefore more critical rotordynamic behaviour of the rotor and increased manufacturing effort of the rotor. This leads to conflicting requirements caused by the desire to keep the rotor short, to simplify manufacturing effort and thus cost, and to raise performance limits caused, for example, by the rotordynamic behaviour.

Often, manufacturing tolerances and material requirements are different for the rotor radial bearing and the rotor axial bearing, making it challenging to find a rotor construction that is simple to manufacture, with a low number of different pieces, materials and interfaces.

WO 2018/041938 A1 and US 2019/249682 A1 disclose a turbo compressor shaft with radial and axial air bearings. A shaft for carrying an impeller and an axial bearing plate is inserted in one end of a tubular bearing portion, and driving portion for carrying elements of an electrical motor is inserted in the other end. The tubular bearing portion is made of a hard material, and the impeller portion and/or the driving portion are made of relatively soft material compared to the hard material of the tubular bearing portion.

U.S. Pat. No. 4,063,850 A discloses a gas turbine rotor with a ceramic turbine wheel and a rotor shaft formed in part of ceramic material, the wheel and part of the rotor being formed as one piece. A ceramic shaft portion of the rotor extends into a cooler zone of the engine where it is connected to a steel shaft portion containing a supporting tube and bridging the two shaft portions. The ceramic shaft portion is supported by a radial air bearing. A ceramic axial bearing disk is formed as one piece with the ceramic shaft portion.

U.S. Pat. Nos. 4,585,396A, 4,854,025A and 4,639,194A disclose ceramic turbine wheels or impellers connected to steel rotor shafts.

WO2017202941 and WO2020002509 disclose rotors with air bearings where the radial and axial bearing is made out of one piece and material.

All of the rotors in prior art are challenging to manufacture and/or do not allow to use optimal materials for the different parts and functions of the rotor.

SUMMARY OF THE INVENTION

It is therefore an object of the invention to create a rotor for a high-speed electrical machine with gas bearings, which offers improvements over the prior art.

These objects are achieved by a rotor for a high-speed electrical machine with gas bearings.

The rotor is for a high-speed electrical machine with gas bearings, the rotor including:

- at least one rotor side radial bearing,
- a rotor side axial bearing,
- a rotor body including the at least one rotor side radial bearing,
- a rotor end piece including the rotor side axial bearing,
- wherein, when seen along the rotor's axis of rotation, a radial bearing section is defined as a section along which a radial bearing extends.

Therein, the rotor end piece radially surrounds the rotor body at the interface of these two parts.

By the rotor end piece radially surrounding the rotor body, or conversely, by the rotor body at least partially extending into the rotor end piece, it becomes possible to join the two separate parts with a relatively small deformation of the rotor body near the interface of the two parts. This in turn makes it possible to have the rotor side radial bearing, which is sensitive to deformation, close to the interface, and this in turn allows to reduce the length of the rotor. In addition, by splitting the rotor into a rotor end piece and a rotor body, as opposed to a single part for rotor radial and axial bearing sections, the materials can be selected separately, thereby allowing the properties to be matched to the different requirements of axial and radial bearing section. The rotor end can be optimized for ease of manufacturing and the rotor body can be optimized for low expansion under thermal and centrifugal loads.

In embodiments, the high-speed electrical machine that the rotor is designed to be used in is a turbo compressor, in which case it can drive an impeller attached to the rotor end piece. In other embodiments, the high-speed electrical machine drives a beam chopper or a rotating prism or mirror or any other load. In other embodiments, the high-speed electrical machine is driven by a turbine, in combination with a turbo compressor impeller or not.

According to another aspect, the rotor is not driven by or part of an electrical machine.

Gas bearings are also called gas lubricated bearings, or fluid film bearings with gaseous fluids. Gas bearings include air bearings.

In embodiments, the rotor body and the rotor end piece are joined by a press-fit, in particular wherein the press fit is a conical fit.

A conical fit has the advantage of reducing tolerance requirements on the elements constituting the press fit, and of reducing internal stresses in the rotor body.

In embodiments, the rotor end piece, seen along the rotor's axis of rotation, does not substantially overlap a radial bearing section of the rotor body,

- in particular wherein the overlap is less than 15% or less than 10% or less than 5% of the diameter of the rotor body in the radial bearing section, or wherein there is no overlap at all.

In embodiments, the rotor body is made of a material that expands, at least approximately, as little as possible under a) rotation and b) temperature, as both high-speed rotation and elevated temperatures are present in high-speed rotors. Expansion ideally should be minimal in order to maintain the small gas bearing clearance between the rotor and a stator's bearing bushing. Furthermore, the material ideally should be hard, in order to minimize wear at start-stop of the gas bearing, where there is dry friction between the rotor and the stator bearing. Furthermore, the rotor body should be lightweight and stiff in order to increase rotordynamic and bearing performance (i.e. increase the maximum stable rotational speed).

It would be preferable for the rotor body to have a high tensile strength and to be easy to machine, but in a trade-off with the abovementioned properties a lower tensile strength and a higher manufacturing effort can be tolerated. This is mitigated since tensile stresses are lower in the rotor body than in the rotor end piece, due to the smaller diameter of the rotor body, and furthermore by keeping the shape of the rotor body simple, allowing for easier manufacturing than for the rotor end piece.

In embodiments, the rotor end piece is made of a material that has a high ratio of tensile strength to density, as this allows for a comparatively higher circumferential speed and therefore a larger axial bearing outer diameter for a given rotational speed. A larger axial bearing diameter allows for a larger maximum axial load, which in turn is beneficial for withstanding vibrations and for axial thrust resulting from, for example, an impeller mounted onto the rotor. Furthermore, for the rotor end piece, which has a shape that is more complex than that of the rotor body, a material can be used that is easier to machine than the material for the rotor body, reducing the machining cost. As for the rotor body, the material ideally should be hard, in order to minimize wear at start-stop of the gas bearing, where there is dry friction between the rotor and the stator axial bearing.

Although it would be preferable for the rotor end piece to exhibit low expansion under a) rotation and b) temperature, but in a trade-off with the abovementioned properties a higher expansion can be tolerated.

As a result, the material for rotor body and rotor end piece are different. This allows to separate the different requirements for

- the rotor end piece, in particular for the axial bearing's ratio of tensile strength to density and the simple machining of its more complex form and tolerances, and
- the rotor body, in particular for the radial bearing's low expansion under temperature and rotation by separating the rotor into two parts that can be made out of two different materials, the two different materials being optimised for the different requirements.

Whereas in the prior art in which a combination of different materials is present. the part connecting the axial bearing and the impeller to the rest of the rotor, (having a high coefficient of thermal expansion (CTE)), at the interface of the two parts, is arranged to be on the inside, and the part including the radial bearing section (material with a low CTE) on the outside. According to the present invention the opposite configuration can be realised.

In summary, a first type of material, which can also be called ceramic-type material, is used for the rotor body 2. In embodiments, the first type material has one or more of the following properties:

- low CTE: lower than 7E-6 K^−1, or 5E-6 K^−1 or 4E-6 K^−1.
- low density: lower than 4500 kg/m^3 or lower than 3500 kg/m^3.
- high ratio of e-modulus to density: higher than 250 GPa/3100 kg/m^3 or 350 GPa/3100 kg/m^3.
- high hardness: HK5 (Vickers hardness) higher than 10 GPa, or 15 GPa, or 20 GPa.

Typical materials of the first type are: Ceramic materials, more specifically SiN, SiC, AlO. Further alternatives are: iron-nickel alloys (such as Invar), glass-ceramics, tungsten carbide, carbide metals.

In summary, a second type of material, which can also be called metal-type material, is used for the rotor end piece 3. In embodiments, the second type material has a good machinability and has one or more of the following properties:

- high hardness (Rockwell hardness): higher than 40 HRC or 50 HRC or 55 HRC.
- high ratio of tensile strength to density: higher than 700 MPa/7700 kg/m^3 or 1500 MPa/7700 kg/m^3 or 2000 MPa/7700 kg/m^3.

Typical materials are: Metals, more specifically steels, more specifically high-strength and hard steels, in particular EN 10027-2 steel number 1.4108, 1.4125, 1.4112.

In embodiments, a first set of material features is present, including the features that the rotor body material has a CTE lower than 7E-6 K^−1, in particular lower than 5E-6 K^−1 even more in particular lower than 4E-6 K^−1, and the rotor end piece material is a metal, in particular a steel.

In embodiments, a second set of material features is present, which includes the first set of material features and further includes the feature that the rotor body material has a HK5 or Vickers hardness larger than 10 GPa, in particular larger than 15 GPa, even more in particular larger than 20 GPa.

In embodiments, a third set of material features is present, which includes the second set of material features and further includes the feature that the rotor end piece has a Rockwell hardness larger than 40 HRC, in particular larger than 50 HRC, even more in particular larger than 55 HRC.

In embodiments, a fourth set of material features is present, which includes the third set of material features and further includes the feature that the rotor body has a density lower than 4500 kg/m^3, in particular lower than 3500 kg/m^3.

In embodiments, a fifth set of material features is present, which includes the fourth set of material features and further includes the feature that the rotor body has a ratio of Young's modulus to density of larger than 250 GPa/3100 kg/m^3, in particular larger than 350 GPa/3100 kg/m^3.

According to embodiments, an order of priorities of the abovementioned material properties defining the rotor body and rotor end piece is:

- first priority: CTE of the rotor body and material of the rotor end piece;
- second priority: Vickers Hardness of the rotor body;
- third priority: Rockwell Hardness of the rotor end piece;
- fourth priority: density of the rotor body; and
- fifth priority: Young's modulus divided by density of the rotor body; and
- sixth priority: high strength divided by density of second type material.

Other parts of the rotor, presented below, can also be of the first type material or the second type material, with the same or with different priorities on the material properties.

In embodiments, a length of a press fit section in which the rotor body and the rotor end piece overlap, seen along the rotor's axis of rotation, is less than 50% of the diameter of the rotor body, in particular less than 40% of the diameter of the rotor body, in particular less than 30% of the diameter of the rotor body.

In embodiments, the length of the press fit section, is less than 5% of the rotor length, in particular less than 4% of the rotor length, in particular less than 3% of the rotor length.

It is the case that even with such relatively short press fit sections it is still possible to attain a sufficiently strong connection. This allows to shorten the rotor.

In embodiments, when seen along the rotor's axis of rotation, an axial bearing section is a section including the rotor side axial bearing, and wherein a circumferential groove is arranged between the axial bearing section and a section in which the rotor end piece and rotor body overlap.

In particular, a radial depth of the circumferential groove is at least 30%, in particular at least 50%, in particular at least 70% of a radial thickness of an annular section of the rotor end piece where it radially surrounds the rotor body.

This creates a thermal barrier between the axial bearing or thrust bearing, which heats up due to windage losses, and the press fit, which is sensitive to temperature changes, and further also to the radial bearings which also are sensitive to temperature changes. A further advantage is that the circumferential groove can reduce deformation of the rotor side axial bearing due to stresses that would be present without the groove. Such stresses would result from the press fit or from an axial geometrical asymmetry between left and right hand side on the rotor end piece. Furthermore, lift-off of the press fit between rotor end piece and rotor body due to centrifugal expansion of the rotor side axial bearing during high-speed rotation can be avoided.

In embodiments, the rotor end piece includes a hollow section that can act as a press fit compensating volume and receive gas displaced when establishing the press fit. This can eliminate the problem of compressed gas forcing the press fit apart. Furthermore, it can render the rotor end piece more elastic and improve the press fit. Furthermore, the overhanging rotor end piece being hollow reduces its weight, improving the dynamic behaviour of the rotor and stability of the bearings.

In embodiments, the rotor end piece includes a hollow section, the hollow section extending in the axial direction along at least the axial bearing section and in particular along at least 50% or 70% of the length of the rotor end piece in the axial direction, In embodiments, the hollow section volume includes or constitutes a ventilating duct establishing a fluid connection to a surrounding of the rotor, in particular wherein the ventilating duct is an axially extending through hole.

In embodiments, the hollow section is enclosed in a gas-tight manner and in particular where the hollow section constitutes a press fit compensation volume arranged to receive gas displaced when joining the rotor body to the rotor end piece and thereby establishing the press fit, even more in particular wherein the press fit compensating volume has a volume of at least the one fifth of the volume of the part of the rotor body that is inserted into the rotor end piece.

In embodiments, an inner diameter of the hollow section is 50% to 100% of the diameter of the central plug of the rotor body.

In embodiments, in regions of the rotor end piece other than the axial bearing section, a wall thickness of the rotor end piece where the hollow section is present is at most 25% of the radius of the rotor end piece at the same axial location.

If the hollow section includes or constitutes a ventilating duct, then in addition to eliminating the compression of gas mentioned above, it also eliminates the presence of a gas pocket that can slowly leak and contaminate process gas.

If the hollow section is enclosed in a gas-tight manner, this has the advantage of keeping solid material such as particles or dust that might appear during manufacturing or in the process gas from entering into the rotor and resulting in unwanted wear or unbalance, or unwanted contamination of the process gas during operation. In embodiments, a central bore constituting the hollow section and/or the press fit compensating volume is machined to be closed at the end opposite the press fit. In other embodiments, it is manufactured as a through hole and closed with a cap or plug element. Such a plug can also be used to fill the central bore to a large extent, compensating a deformation of the rotor end piece by the plug in the rotor body.

In embodiments, the rotor is compressed in the axial direction by a tensioning bolt, in particular wherein at least the rotor end part and the rotor body are compressed, and optionally also a magnet section of the rotor, and optionally also an impeller or another load, is compressed by the tensioning bolt.

This has the advantage of further reducing tolerance requirements on the elements constituting the press fit, and of reducing the effort for assembling the different parts of the rotor.

In embodiments, the rotor body is shaped to have an axially extending central plug, inserted in a central bore of the rotor end piece, with radially extended contact faces on the rotor body and the rotor end piece facing one another, wherein on the rotor end piece an edge between the central bore and the contact face is chamfered, and on the rotor body an edge is rounded, with the chamfering and rounding of the two pieces being chosen such that an axial distance between the press-fit section and the start of the rounding of the rotor body is present, in particular wherein this axial distance is at least one fourth the axial extension of the chamfer. The chamfer may be replaced with another similar form such as a recess or fillet. The radius may be replaced with another similar form without a constant radius.

In other words, a radius of the rounded edge of the rotor body is less than three quarters the axial extension of the chamfer. In embodiments, the radius is at least 3% of the diameter of the rotor body.

This allows, as opposed to a sharp edge and/or a small or no distance d as a person skilled in the art of constructing chamfers and radii would construct it, to reduce internal stresses in the rotor body, both around the radius and in the region between the radius and the press fit section.

In embodiments, the rotor body is a solid body.

That is, it is not a hollow body. This can increase its mechanical stability.

In embodiments, the rotor body is shaped to be a hollow cylinder.

This can have the advantage of being simpler to manufacture and leading to a weight reduction and increase rotor stability.

In embodiments, the rotor includes a permanent magnet, and when seen along the rotor's axis of rotation, a magnet section is a section along which the permanent magnet extends, and in particular wherein

- either the permanent magnet is arranged inside the rotor body, in particular with the magnet section being at least approximately centred between two radial bearing sections,
- or the permanent magnet is arranged at a distal end of the rotor body, opposite to the rotor end piece.

The permanent magnet being centred allows to arrange the electro-magnetic elements of the electrical machine, seen in the axial direction, between the radial bearing sections, shortening the construction of the machine.

The permanent magnet being at the distal end allows to arrange the electro-magnetic elements of the electrical machine, seen in the axial direction, outside the radial bearing sections, simplifying the rotor assembly and the stator side bearing assembly.

In embodiments, the rotor body, in a section inserted into the rotor end piece, has the same outer diameter as in an adjacent, proximal bearing section, and in particular also the same outer diameter as in a second, distal bearing section.

This creates a particularly easy to manufacture shape of the rotor body. Furthermore, internal stresses in the rotor body due to a press fit can be reduced, when compared to a design in which the diameter of the rotor body is stepped.

In embodiments, the rotor includes a further end piece, arranged at an end of the rotor opposite to the rotor end piece. The further end piece can be designed for attaching a further impeller or any other load or a turbine.

In embodiments, the further end piece includes a cylindrical sleeve arranged inside the rotor body, the permanent magnet being arranged in inside the cylindrical sleeve.

In embodiments, the rotor end piece includes an intermediate ring and an axial bearing plate, the axial bearing plate being an annular plate, and being seated on the intermediate ring. The intermediate ring in turn can be seated on the rotor body. In particular, the axial bearing plate can be made of a first type or ceramic-type material. Furthermore, the intermediate ring can be made of a second type material, such as a metal-type material, that is softer relative to the axial bearing plate and the rotor body. As a result, the intermediate ring can limit tensile stresses exerted on the axial bearing plate due to expansion of the rotor body or other parts of the rotor end piece. This can keep tensile stresses in the axial bearing plate below its tensile strength.

In embodiments, a sixth set of material features is present, which includes the second set of material features and further includes the feature of the axial bearing plate having a HK5 (Vickers hardness) larger than 10 GPa, in particular larger than 15 GPa, even more in particular larger than 20 GPa.

In embodiments, a seventh set of material features is present, which includes the sixth set of material features and further includes the feature of the axial bearing plate material having a density lower than 4500 kg/m^3, in particular lower than 3500 kg/m^3.

In embodiments, an eight set of material features is present, which includes the seventh set of material features and further includes the feature of the rotor body material having a density lower than 4500 kg/m^3, in particular lower than 3500 kg/m^3.

According to embodiments, an order of priorities of the abovementioned material properties defining the axial bearing plate, the rotor body and the rotor end piece is:

first priority: CTE of the rotor body and material of the rotor end piece:

second priority: Vickers Hardness of the axial bearing plate:

third priority: Vickers Hardness of the rotor body:

fourth priority: density of the axial bearing plate:

fifth priority: density of the rotor body.

In embodiments, the rotor end piece includes an axial bearing plate, the axial bearing plate being an annular plate and being seated on the rotor body, and in particular wherein the material of the rotor body has a CTE lower than 7E-6 K^−1, in particular lower than 5E-6 K^−1 even more in particular lower than 4E-6 K^−1, and the axial bearing plate is made of a metal, in particular of a steel.

In other words, in this embodiment the rotor end piece can be constituted mainly or entirely by the axial bearing plate.

In embodiments, a ninth set of material features is present, including the features that the material of the rotor body has a CTE lower than 7E-6 K^−1, in particular lower than 5E-6 K^−1 even more in particular lower than 4E-6 K^−1, and the axial bearing plate is made of a metal, in particular of a steel.

In embodiments, a tenth set of material features is present, which includes the ninth set of material features and further includes the feature that the rotor body has a HK5 or Vickers hardness larger than 10 GPa, in particular larger than 15 GPa, even more in particular larger than 20 GPa.

In embodiments, an eleventh set of material features is present, which includes the tenth set of material features and further includes the feature that the axial bearing plate has a Rockwell hardness larger than 40 HRC, in particular larger than 50 HRC, even more in particular larger than 55 HRC.

In embodiments, a twelfth set of material features is present, which includes the eleventh set of material features and further includes the feature that the rotor body has a density lower than 4500 kg/m^3, in particular lower than 3500 kg/m^3.

According to embodiments, an order of priorities of the abovementioned material properties defining the axial bearing plate and the rotor body is:

first priority: CTE of the rotor body and material of the axial bearing plate:

second priority: Vickers Hardness of the rotor body:

third priority: Rockwell Hardness of the axial bearing plate:

third priority: density of the rotor body.

According to an aspect of the invention, the circumferential groove as described herein is implemented independently of whether the rotor body and rotor end piece are separate parts. In this case, the rotor is defined by the following features:

A rotor for a high-speed electrical machine with gas bearings, the rotor including:

at least one rotor side radial bearing, a rotor side axial bearing, at least one rotor side radial bearing, wherein, when seen along the rotor's axis of rotation, a radial bearing section is defined as a section along which a radial bearing extends, and wherein when seen along the rotor's axis of rotation, an axial bearing section is a section including the rotor side axial bearing, and wherein a circumferential groove is arranged between the axial bearing section and its nearest radial bearing section.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION OF THE INVENTION

In principle, identical parts are provided with the same reference symbols in the figures.

Figure 1:
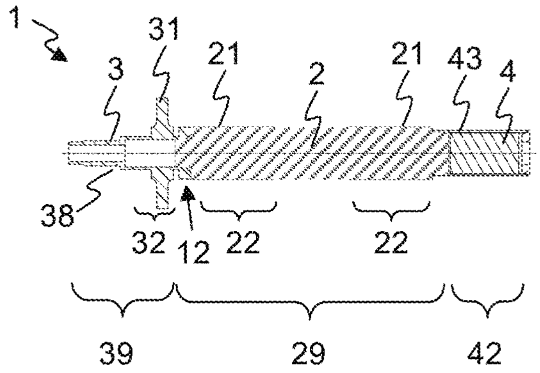
FIG. 1 a rotor for a high-speed electrical machine.

FIG. 1 schematically shows a rotor 1, with a rotor body 2 and a rotor end piece 3. The rotor body 2 has two rotor side radial bearings 21. The rotor end piece 3 includes a rotor side thrust bearing plate or rotor side axial bearing 31. When seen along the rotor's axis of rotation, for each rotor side radial bearing 21 a corresponding radial bearing section 22 is defined as a section along which the radial bearing 21 extends. This is the section in which the gas bearing generates radial forces. Usually, the radial bearing section has an at least approximately constant radial bearing gap. Likewise, an axial bearing section 32 is defined as section along which the rotor side axial bearing 31 extends. The rotor body 2 and rotor end piece 3 are joined by the rotor end piece 3 radially surrounding the rotor body 2 at the interface of these two parts, typically with a press fit 11. Press fit is also called interference fit, shrink fit, or similar. The rotor end piece 3 includes an axial stub or rotor stub shaft 38 for carrying a part driven by or driving the rotor 1, for example an impeller, turbine, beam chopper, rotating prism, etc.

The rotor end piece 3 is joined to the rotor body 2 at a first or proximal end of the rotor body 2. The rotor body 2 is made of a first type of material being a ceramic-type material, and the rotor end piece 3 is made of a second type of material being a metal-type material.

At an opposite, second or distal end of the rotor body 2, a permanent magnet 4 is joined to the rotor body 2. When seen along the rotor's axis of rotation, a rotor body section 29, a rotor end section 39, a press fit section 12 and a magnet section 42 are defined as sections along which the rotor body 2, rotor end piece 3, press fit 11 and permanent magnet 4 extend, respectively.

For clarity, not all reference numbers shown in FIG. 1 shall be repeated in the following figures.

Figure 2:
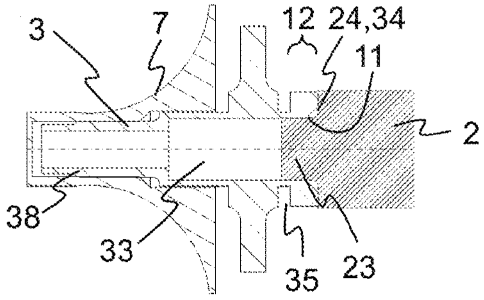
FIG. 2-4 details of rotor end pieces and an interface between a rotor body and the rotor end piece.
Figure 3A:
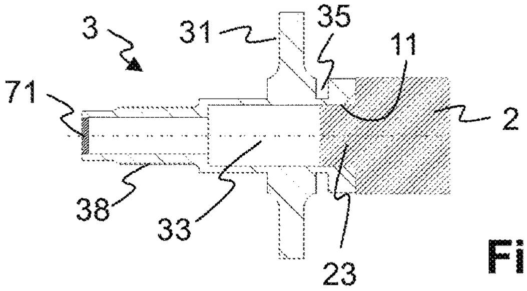
Figure 3B:
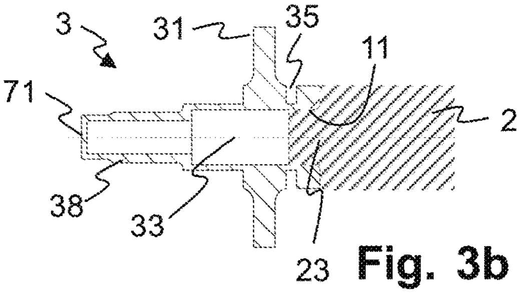

FIG. 2 schematically shows details of the rotor end piece 3 and of its interface to the rotor body 2 according to one embodiment. At the interface, a central plug 23 of the rotor body 2 is inserted into a central bore 33 of the rotor end piece 3, forming a press fit 11. A rotor body contact face 24 of the rotor body 2 is pressed against an end piece contact face 34 of the rotor end piece 3. The central bore 33 acts as a press fit compensating volume 33, taking up air or gas displaced by the central plug 23. As opposed to the embodiment of FIG. 1, where the central bore 33 is open at one end and acts as a ventilating duct, here it is closed by an impeller 7, or another element driven by the rotor 1, covering the end of the central bore 33 in a gas-tight manner. In the embodiment of FIG. 3*a* or 3*b*, the central bore 33 is covered by an end cap 71, which can be a separate element (FIG. 3*a*) or combined with the rotor end piece 3 (FIG. 3*b*). This prevents solid material or gas from entering into or escaping from the central bore 33. The diameter of the rotor stub shaft 38 varies, when seen along the axial direction, e.g. by a step-wise change in the outer and inner diameter.

FIGS. 1 through 3*b* also show a circumferential groove 35 arranged between the axial bearing section 32 and a section in which the rotor end piece 3 and rotor body 2 overlap. The circumferential groove 35 on the one hand constitutes a thermal barrier, slowing heat transfer from the rotor side axial bearing 31 to the interface, and on the other hand reduces a deformation of the rotor end piece 3 at the interface from deforming the rotor side axial bearing 31. A radial depth of the circumferential groove 35 is at least 30%, in particular at least 50%, in particular at least 70% of a radial thickness of the ring or annular section of the rotor end piece 3 where it radially surrounds the rotor body 2. The circumferential groove 35 can be realised in the other embodiments presented herein as well, although it is not drawn in each case.

Figure 4:
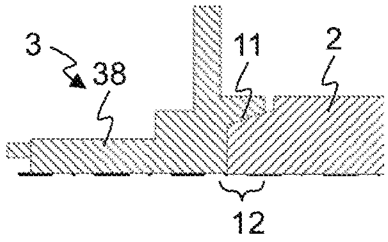

FIG. 4 shows the press fit being a conical fit, with the rotor body 2 and rotor end piece 3 being pressed towards one another in the axial direction.

Figure 5:
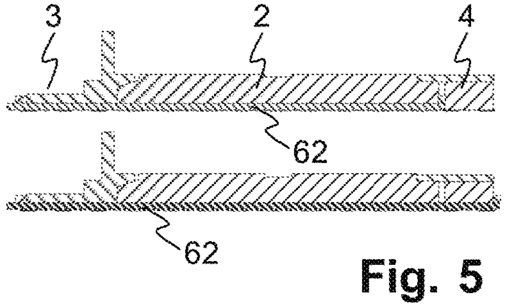
FIG. 5 rotors axially compressed by a tensioning bolt.

FIG. 5 shows the rotor I being compressed in the axial direction by a tensioning bolt 62. In the top part of the figure, a group of compressed elements including the rotor end part 3 and the rotor body 2, and optionally also an impeller (7) or another load, are compressed by the tensioning bolt 62. In the bottom part of the figure, the group includes the permanent magnet 4 or, more generally, a part of the magnet section 42 as well.

A tensioning bolt 62 can also be present in the other embodiments shown herein, in particular where the press fit 11 is present in a cylindrical rather than conical fit.

Figure 6:
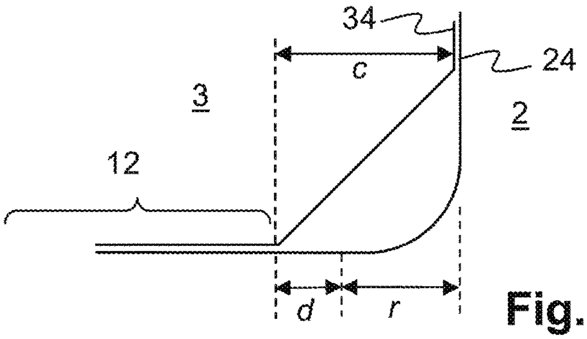
FIG. 6 further details of the interface.

FIG. 6 shows a detail of the interface. The radially extended contact faces 24, 34 on the rotor body 2 and the rotor end piece 3 facing one another are drawn with a gap in between, whereas in reality they may touch one another or may have a gap. Likewise, in a press fit section 12 a gap is drawn whereas in reality there is a press fit between the rotor body 2 and rotor end piece 3. On the rotor end piece 3 an edge between the central bore 33 and the contact face 34 is chamfered, an extension of the chamfer denoted by c. The chamfer may be replaced with another similar form such as a recess or fillet. On the rotor body 2 an edge facing the chamfer is rounded, with a radius r. The radius may be replaced with another similar form without a constant radius. The size of the chamfer and the radius are chosen such that an axial distance d between the press-fit section 12 and the start of the rounding of the rotor body is present. This allows, as opposed to a sharp edge and/or a small or no distance d as a person skilled in the art of constructing chamfers and radii would construct it, to reduce internal stresses in the rotor body 2. both around the radius and in the region between the radius and the press fit section 12. In embodiments, this axial distance d is at least one fourth the axial extension c of the chamfer, and/or at least one third of the radius r. In other words, a radius of the rounded edge of the rotor body is less than three quarters the axial extension of the chamfer. In embodiments, the radius is at least 3% of the diameter of the rotor body.

The combination of the radius—made possible by the chamfer—and the circumferential groove makes it possible to keep the press fit section 12 short in the axial direction.

Figure 7:
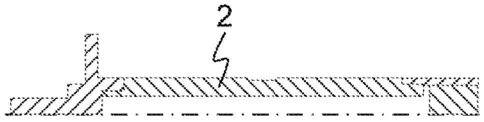
FIG. 7-8 rotors with a hollow rotor body.

FIG. 7 shows a hollow rotor body 2. It can be manufactured, for example, by extrusion.

Figure 8:
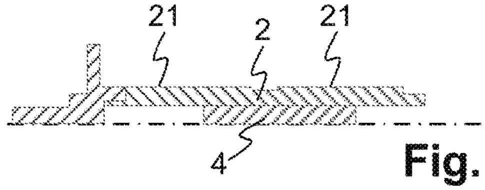

FIG. 8 shows a hollow rotor body 2 with the permanent magnet 4 arranged inside. The permanent magnet 4 is arranged between the rotor side radial bearings 21.

Figure 9:
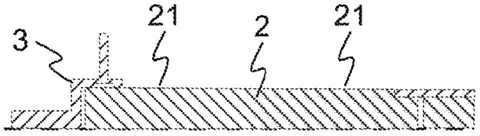
FIG. 9 a rotor with a simple to machine rotor body.

FIG. 9 shows a rotor body 2 without a step in diameter at its proximal end. Rather, the outer diameter of rotor body 2 at the proximal rotor side radial bearing 21 is the same as in a plug section inserted in the rotor end piece 3.

Figure 10:
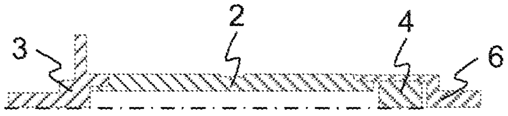
FIG. 10 a rotor with a further end piece.

FIG. 10 shows a rotor body with a further end piece 6 attached to the rotor body's distal end. The further end can drive or be driven by another element such as an impeller or compressor or turbine. The further end piece 6 carries the permanent magnet 4.

FIGS. 11 to 14 show embodiments in which the rotor end piece includes an axial bearing plate 36, the axial bearing plate 36 being an annular plate and being seated on the rotor body 2 (in which case the rotor end piece 3 can consist only of the axial bearing plate 36 and optionally also of an intermediate ring 37) or on the rotor end piece 3. Thus, in these embodiments the axial bearing plate 36 is a part that is shaped separately from the rotor stub shaft 38. This is in contrast to the embodiments of the other Figures, where the axial bearing plate 36 can be integrally shaped with the rotor stub shaft 38.

Figure 11:
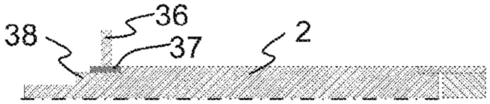
FIG. 11-14 rotors with an axial bearing plate separate from a rotor stub shaft.
Figure 12:
Figure 13:
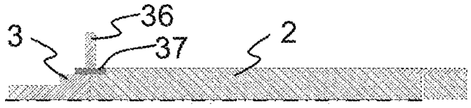
Figure 14:

In FIGS. 11, 12 and 14 the rotor body 2 is integrally shaped with the rotor stub shaft 38. In FIGS. 11, 12 and 13 the axial bearing plate 36 is seated on an intermediate ring 37. In such a configuration, the axial bearing plate 36 and rotor body 2 can be made of a ceramic-type material, and the intermediate ring 37 of a metal-type material. The intermediate ring 37 can absorb an expansion of the rotor body 2 when it heats up, which could otherwise induce tensile stresses in the axial bearing plate 36, that would damage the axial bearing plate 36. In FIG. 14, the axial bearing plate 36 can be made of a metal-type material, and the intermediate ring 37 can be omitted.

Figure 15:
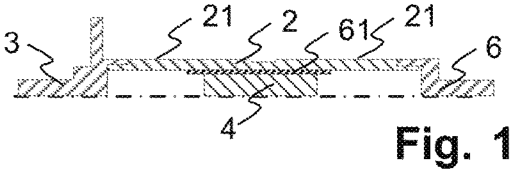
FIG. 15-16 details of rotors with a permanent magnet in a hollow rotor body.
Figure 16:
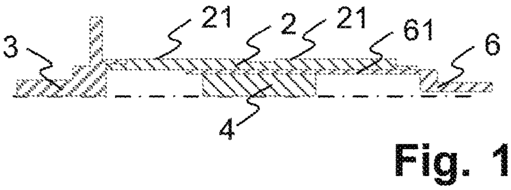

FIGS. 15 and 16 show embodiments in which the rotor body 2 is hollow and the permanent magnet 4 is arranged in the rotor body 2, between the rotor side radial bearings 21. A cylindrical sleeve 61, typically of a metal-type material, is arranged between the permanent magnet 4 and the rotor body 2, for absorbing differences in expansion when the rotor 1 heats up. In the embodiment of FIG. 15, a further end piece 6 (as in the embodiment of FIG. 10) is present, for driving or being driven by another element, not shown. In the embodiment of FIG. 16, the further end piece 6 is integrally shaped with the cylindrical sleeve 61.

Figure 17:
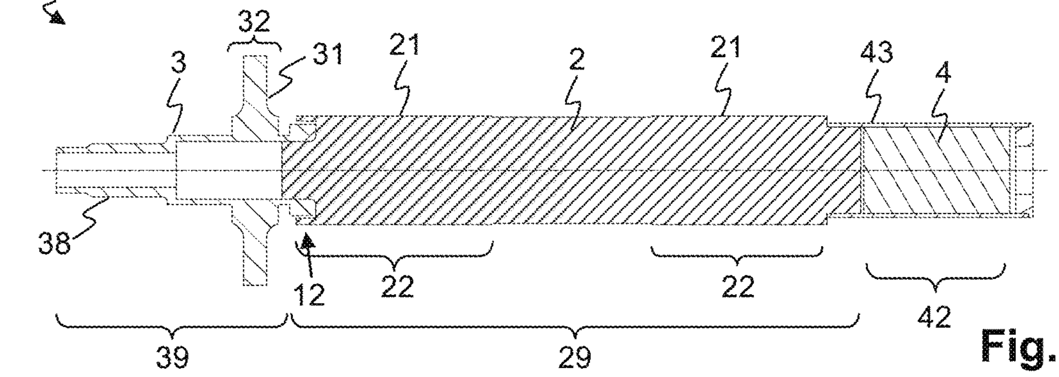
FIG. 17 a rotor end piece overlapping a radial bearing section.

FIG. 17 shows an embodiment in which the rotor end piece 3, seen along the rotor's axis of rotation, does overlap a radial bearing section 22 of the rotor body 2. The radial bearing section 22, at its proximal end, has a short overhanging section that extends partly over the rotor end piece 3 but does not contribute to the interface or press fit between the rotor end piece 3 and the rotor body 2. That is, the overhanging section does not exert any radial forces on the rotor end piece 3, and in particular does not touch the rotor end piece 3.

While the invention has been described in present embodiments, it is distinctly understood that the invention is not limited thereto, but may be otherwise variously embodied and practised within the scope of the claims.

The invention claimed is:

1. A rotor for an electrical machine with gas bearings, the rotor comprising:

at least one rotor side radial bearing, a rotor side axial bearing, a rotor body comprising the at least one rotor side radial bearing, a rotor end piece comprising the rotor side axial bearing and an axial rotor stub shaft, wherein, the rotor has an axis of rotation and, when seen along the rotor axis of rotation, a radial bearing section is defined as a section along which a radial bearing extends, and wherein the rotor end piece radially surrounds the rotor body at the interface of the rotor body and the rotor end piece.

2. The rotor of claim 1, wherein the rotor body and the rotor end piece are joined by a press-fit.

3. The rotor of claim 2, wherein a length of a press fit section in which the rotor body and the rotor end piece overlap, seen along the rotor axis of rotation, is less than 50% of a diameter of the rotor body.

4. The rotor of claim 3, wherein the length of the press fit section in which the rotor body and the rotor end piece overlap, seen along the rotor axis of rotation, is less than 40% of the diameter of the rotor body.

5. The rotor of claim 4, wherein the length of the press fit section in which the rotor body and the rotor end piece overlap is less than 30% of the diameter of the rotor body.

6. The rotor of claim 1, wherein the rotor end piece, seen along the rotor's axis of rotation, does not substantially overlap a radial bearing section of the rotor body, wherein the overlap is less than 15% of a diameter of the rotor body in the radial bearing section.

7. The rotor of claim 6, wherein the overlap is less than 10% of the diameter of the rotor body in the radial bearing section.

8. The rotor of claim 6, wherein the overlap is less than 5% of the diameter of the rotor body in the radial bearing section.

9. The rotor of claim 1, wherein the rotor body material has a coefficient of thermal expansion (CTE) lower than 7E 6 K^1, and the rotor end piece material is a metal.

10. The rotor of claim 1, wherein the rotor body material has a Vickers hardness (HK5) larger than 10 GPa.

11. The rotor of claim 1, wherein when seen along the rotor axis of rotation, an axial bearing section is a section comprising the rotor side axial bearing, and wherein a circumferential groove is arranged between the axial bearing section and a section in which the rotor end piece and rotor body overlap, wherein a radial depth of the circumferential groove is at least 30% of a radial thickness of an annular section of the rotor end piece where it radially surrounds the rotor body.

12. The rotor of claim 1, wherein the rotor end piece comprises a hollow section, the hollow section extending in the axial direction along at least the axial bearing section and along at least 50% of the length of the rotor end piece in the axial direction.

13. The rotor of claim 12, wherein the hollow section volume comprises or constitutes a ventilating duct establishing a fluid connection to a surrounding of the rotor.

14. The rotor claim 12, wherein the hollow section is enclosed in a gas-tight manner where the hollow section constitutes a press fit compensation volume arranged to receive gas displaced when joining the rotor body to the rotor end piece and thereby establishing the press fit.

15. The rotor of claim 1, wherein the rotor is compressed in the axial direction by a tensioning bolt, wherein at least the rotor end part and the rotor body are compressed by the tensioning bolt.

16. The rotor of claim 1, wherein the rotor body is a solid body.

17. The rotor of claim 1, wherein the rotor body is a hollow cylinder.

18. The rotor of claim 1, wherein the rotor comprises a permanent magnet, and when seen along the rotor axis of rotation, a magnet section is a section along which the permanent magnet extends, and wherein either the permanent magnet is arranged inside the rotor body, or the permanent magnet is arranged at a distal end of the rotor body, opposite to the rotor end piece.

19. The rotor of claim 1, wherein the rotor body, in a section inserted into the rotor end piece, has a same outer diameter as in an adjacent, proximal bearing section, and the same outer diameter as in a second, distal bearing section.

20. The rotor of claim 1, wherein the rotor end piece comprises an axial bearing plate, the axial bearing plate being an annular plate and being seated on the rotor body, and wherein the material of the rotor body has a coefficient of thermal expansion (CTE) lower than 7E 6 Kˆ1, and the axial bearing plate is made of a metal.

* * * * *